US012695041B2

(12) United States Patent
Gutmann et al.

(10) Patent No.: US 12,695,041 B2
(45) Date of Patent: Jul. 28, 2026

(54) ELECTRIC SWITCH

(71) Applicant: Tyco Electronics Austria GmbH, Vienna (AT)

(72) Inventors: Markus Gutmann, Vienna (AT); Philipp Harrer, Vienna (AT)

(73) Assignee: TE Connectivity Austria GmbH

( * ) Notice: Subject to any disclaimer, the term of this patent is extended or adjusted under 35 U.S.C. 154(b) by 620 days.

(21) Appl. No.: 17/841,979

(22) Filed: Jun. 16, 2022

(65) Prior Publication Data

US 2022/0310340 A1 Sep. 29, 2022

Related U.S. Application Data

(63) Continuation of application No. PCT/EP2020/086241, filed on Dec. 15, 2020.

(30) Foreign Application Priority Data

Dec. 16, 2019 (EP) .................................... 19216438

(51) Int. Cl.
*H01H 50/18* (2006.01)
*H01H 50/44* (2006.01)
*H01H 50/54* (2006.01)

(52) U.S. Cl.
CPC ............ *H01H 50/18* (2013.01); *H01H 50/44* (2013.01); *H01H 50/54* (2013.01)

(58) Field of Classification Search
CPC ..................................................... H01H 50/18
USPC ........................................................... 338/78
See application file for complete search history.

(56) References Cited

U.S. PATENT DOCUMENTS

| | | | | |
|---|---|---|---|---|
| 4,010,433 A * | 3/1977 | Nishimura | H01H 50/041 335/129 |
| 4,625,191 A | 11/1986 | Oberndorfer et al. | |
| 4,707,675 A * | 11/1987 | Motoyama | H01H 51/2227 335/133 |
| 4,831,348 A * | 5/1989 | Agatahama | H01H 51/2227 335/128 |
| 4,843,360 A | 6/1989 | Yoshino et al. | |
| 5,148,136 A * | 9/1992 | Kidd | H01H 50/048 335/83 |
| 5,162,764 A * | 11/1992 | Saso | H01H 51/2227 335/78 |

(Continued)

FOREIGN PATENT DOCUMENTS

| | | |
|---|---|---|
| DE | 4042424 C2 | 4/1994 |
| GB | 851933 A | 10/1960 |

(Continued)

OTHER PUBLICATIONS

Japanese Office Action dated Jul. 4, 2023 with English translation, corresponding to Application No. 2022-535866, 9 pages.

(Continued)

*Primary Examiner* — Alexander Talpalatski
(74) *Attorney, Agent, or Firm* — Barley Snyder

(57) ABSTRACT

A switch includes a set of contacts and a drive mechanism opening and closing the set of contacts. The drive mechanism is located beside the set of contacts in a direction perpendicular to an opening direction in which the contacts are movable to at least one of open and close.

20 Claims, 12 Drawing Sheets

(56) References Cited

U.S. PATENT DOCUMENTS

| | | | | | |
|---|---|---|---|---|---|
| 5,216,396 | A * | 6/1993 | Stahly | H01H 50/28 335/78 |
| 5,359,305 | A * | 10/1994 | Kitamura | H01H 51/2227 335/83 |
| 5,696,475 | A * | 12/1997 | Yoshitani | H01H 50/026 335/131 |
| 5,994,986 | A * | 11/1999 | Takahashi | H01H 51/2272 335/83 |
| 6,107,903 | A * | 8/2000 | Sako | H01H 51/229 335/78 |
| 6,144,270 | A * | 11/2000 | Mader | H01H 50/24 335/78 |
| 8,193,881 | B2 * | 6/2012 | Yuba | H01H 9/443 335/78 |
| 8,203,403 | B2 * | 6/2012 | Moeller | H01H 51/2227 335/78 |
| 10,658,140 | B2 * | 5/2020 | Itoda | H01H 9/44 |
| 2003/0062977 | A1 | 4/2003 | Mochizuki | |
| 2017/0323748 | A1 | 11/2017 | Gutmann et al. | |

FOREIGN PATENT DOCUMENTS

| | | | |
|---|---|---|---|
| JP | S52022139 | U | 2/1977 |
| JP | S57167546 | U | 10/1982 |
| JP | H09069328 | A | 3/1997 |
| JP | 2003115248 | A | 4/2003 |

OTHER PUBLICATIONS

PCT International Search Report and Written Opinion, Application No. PCT/EP2020/086241, Dated: Feb. 25, 2021, 12 pages.

Extended European Search Report, Application No. 19216438.2-1202, Dated: May 12, 2020, 6 pages.

Japanese Office Action dated Feb. 6, 2024 with English translation, corresponding to Application No. 2022-535866, 8 pages.

Chinese Office Action dated Dec. 14, 2024 with English translation, corresponding to Application No. 202080086501.X, 10 pages.

* cited by examiner

A - A

ELECTRIC SWITCH

CROSS-REFERENCE TO RELATED APPLICATIONS

This application is a continuation of PCT International Application No. PCT/EP2020/086241, filed on Dec. 15, 2020, which claims priority under 35 U.S.C. § 119 to European Patent Application No. 19216438.2, filed on Dec. 16, 2019.

FIELD OF THE INVENTION

The invention relates to an electric switch comprising a set of contacts and a drive mechanism for opening and closing the set of contacts.

BACKGROUND

Previous electric switches have the disadvantage that they are bulky.

SUMMARY

A switch includes a set of contacts and a drive mechanism opening and closing the set of contacts. The drive mechanism is located beside the set of contacts in a direction perpendicular to an opening direction in which the contacts are movable to at least one of open and close.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
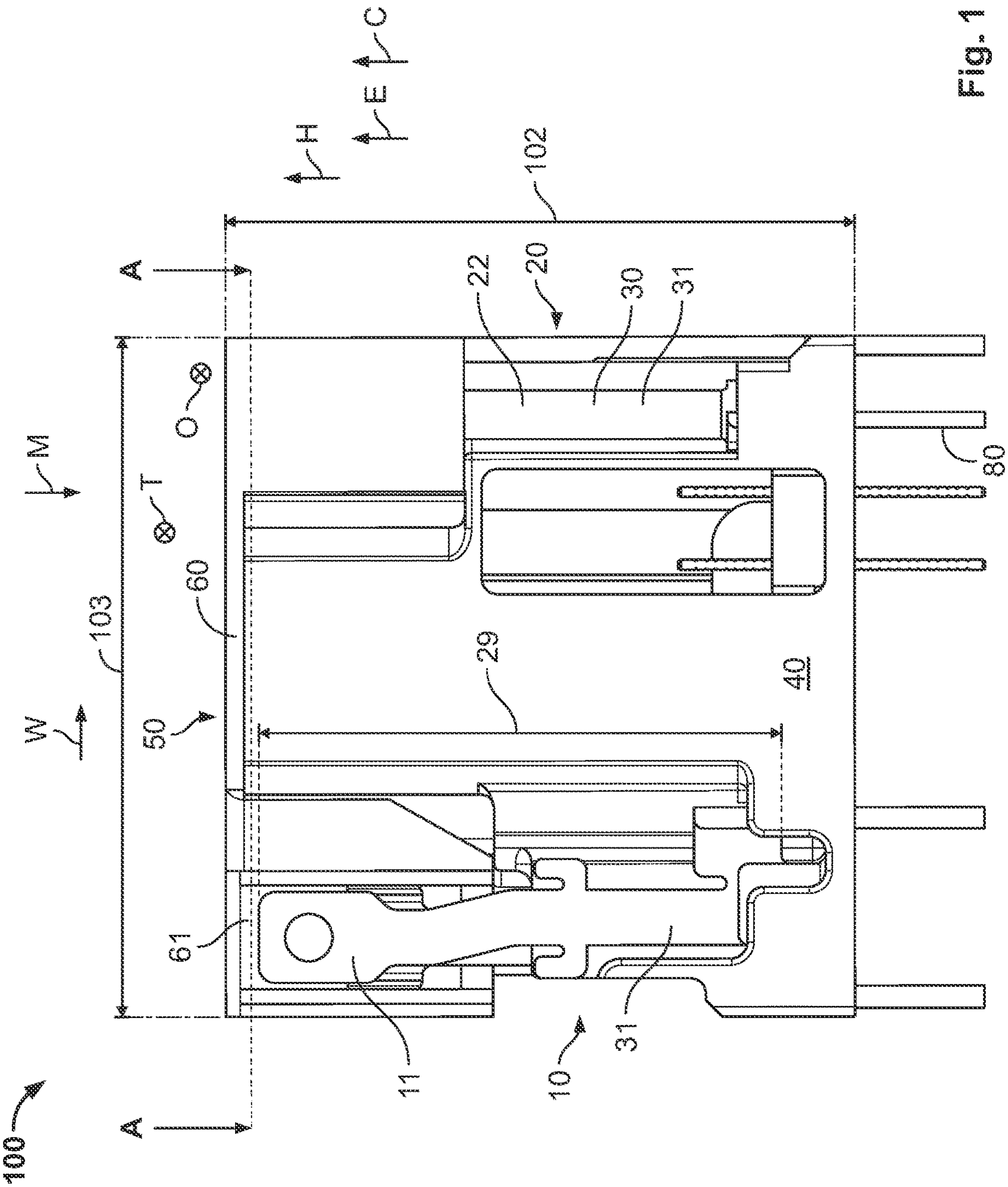
FIG. 1 is a schematic front view of an embodiment of a switch.

The invention will now be described in greater detail and in an exemplary manner using advantageous embodiments and with reference to the drawings. The described embodiments are only possible configurations in which, however, the individual features described herein can be provided independently of one another or can be omitted.

An electric switch 100 according to an embodiment is shown in FIGS. 1-7. The electric switch 100 comprises a first set of contacts 10 and a drive mechanism 50 for opening and closing the first set of contacts 10. The first set of contacts 10 comprises a first contact 11 and a second contact 12.

Figure 2:
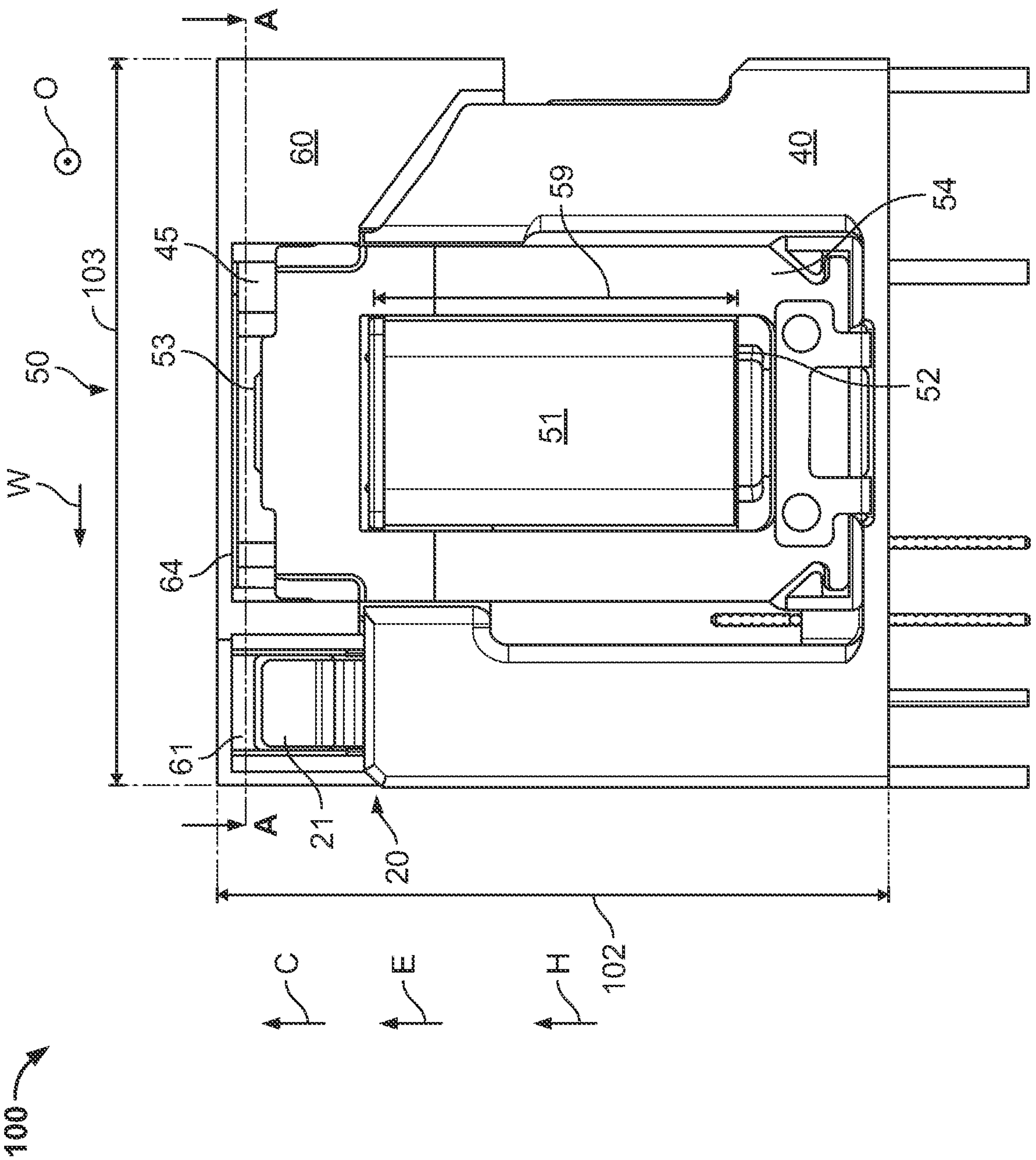
FIG. 2 is a schematic back view of the embodiment of a switch.
Figure 4:
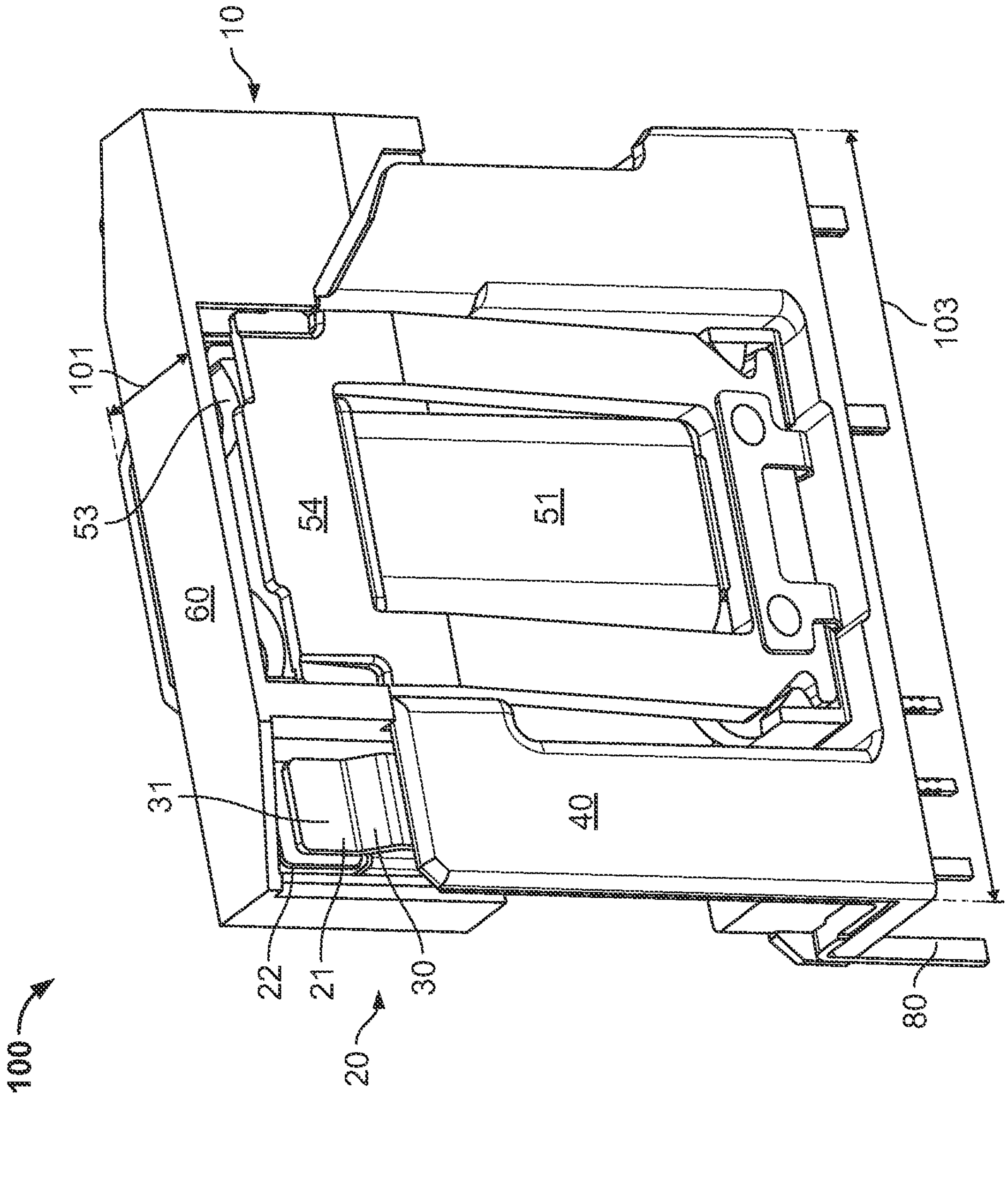
FIG. 4 is a schematic perspective view of the embodiment of a switch from a different angle.
Figure 7:
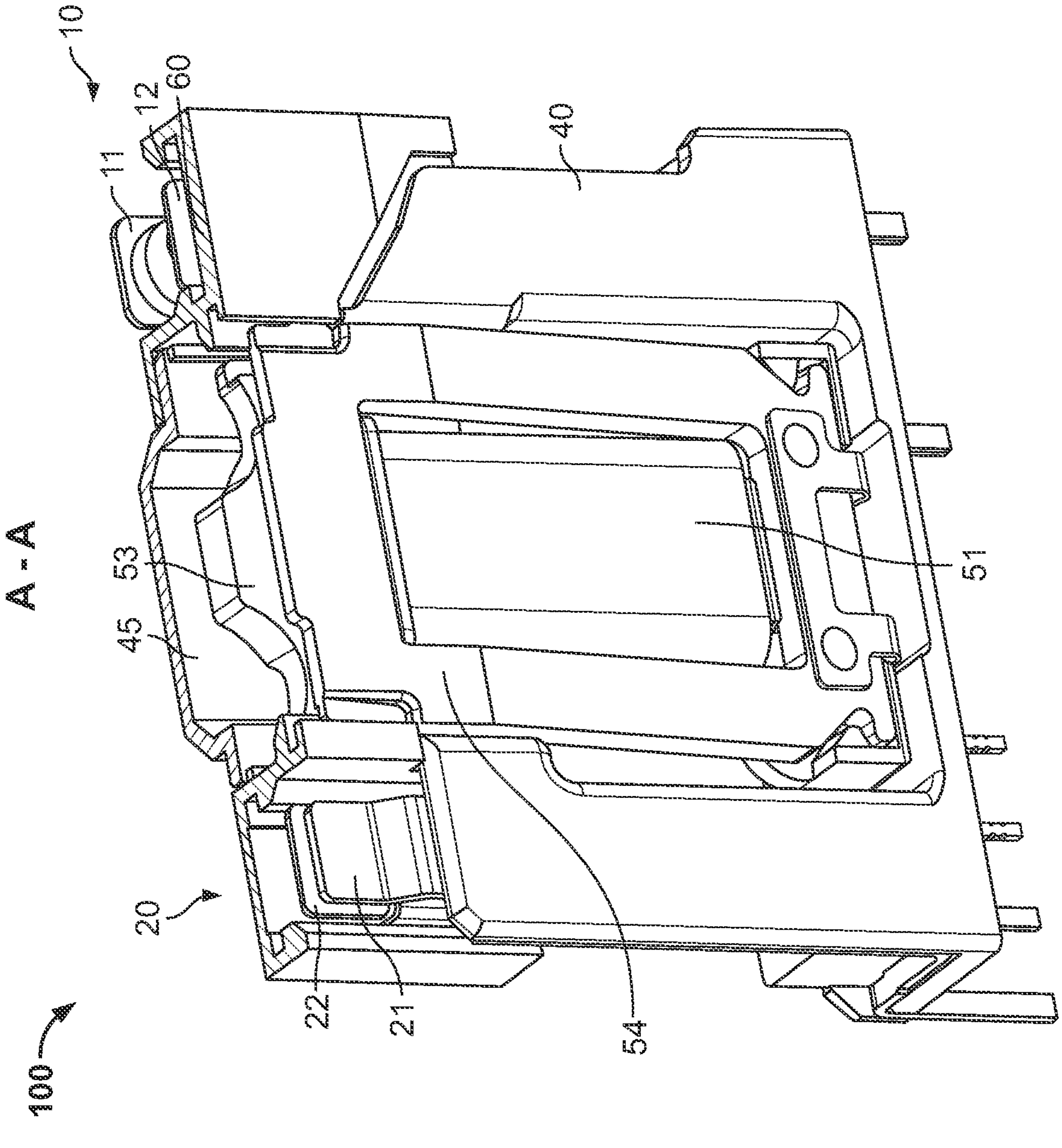
FIG. 7 is a schematic perspective sectional view of the embodiment of a switch from a different angle.
Figure 8:
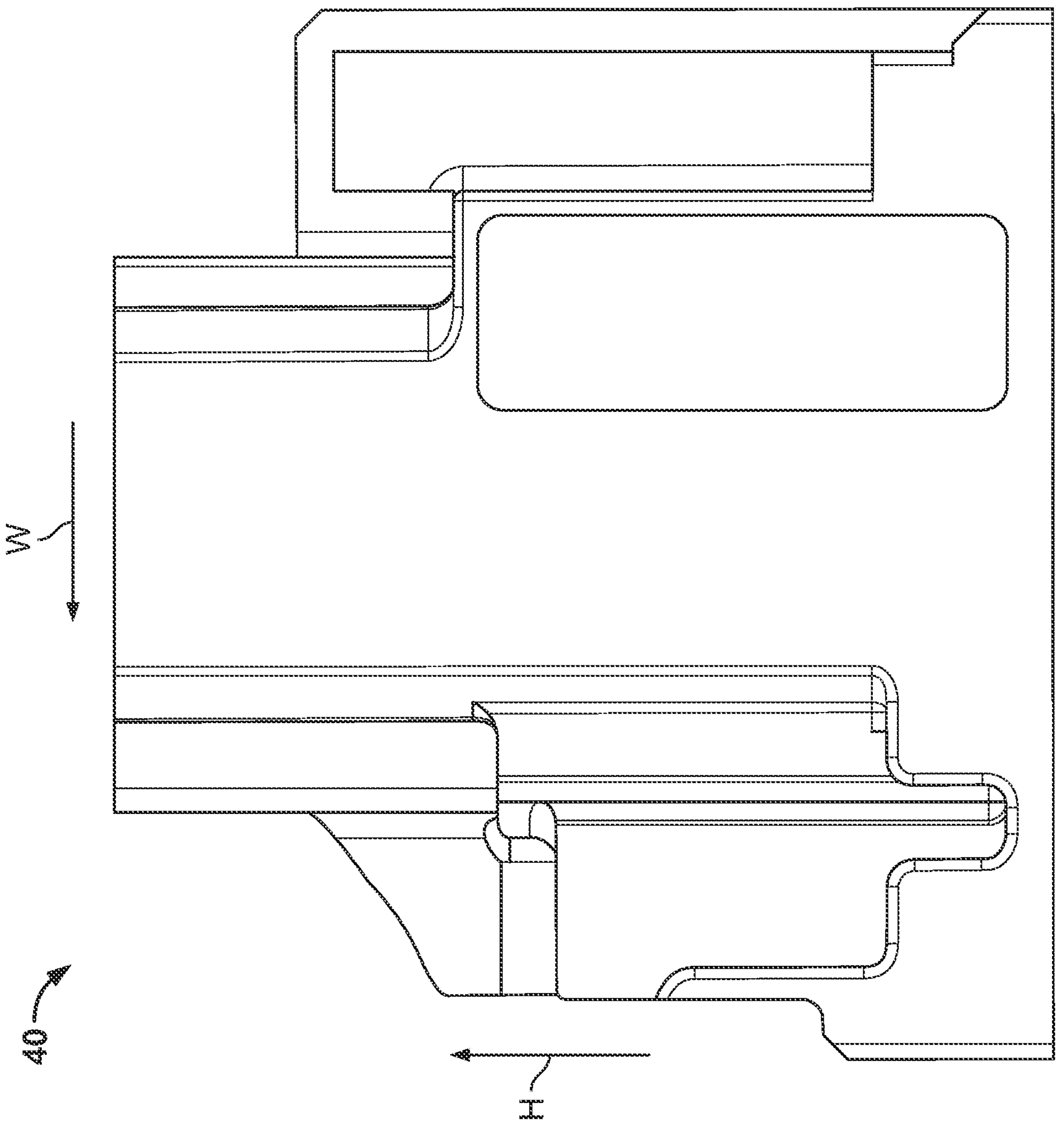
FIG. 8 is a schematic front view of a support structure of the embodiment of a switch.
Figure 9:
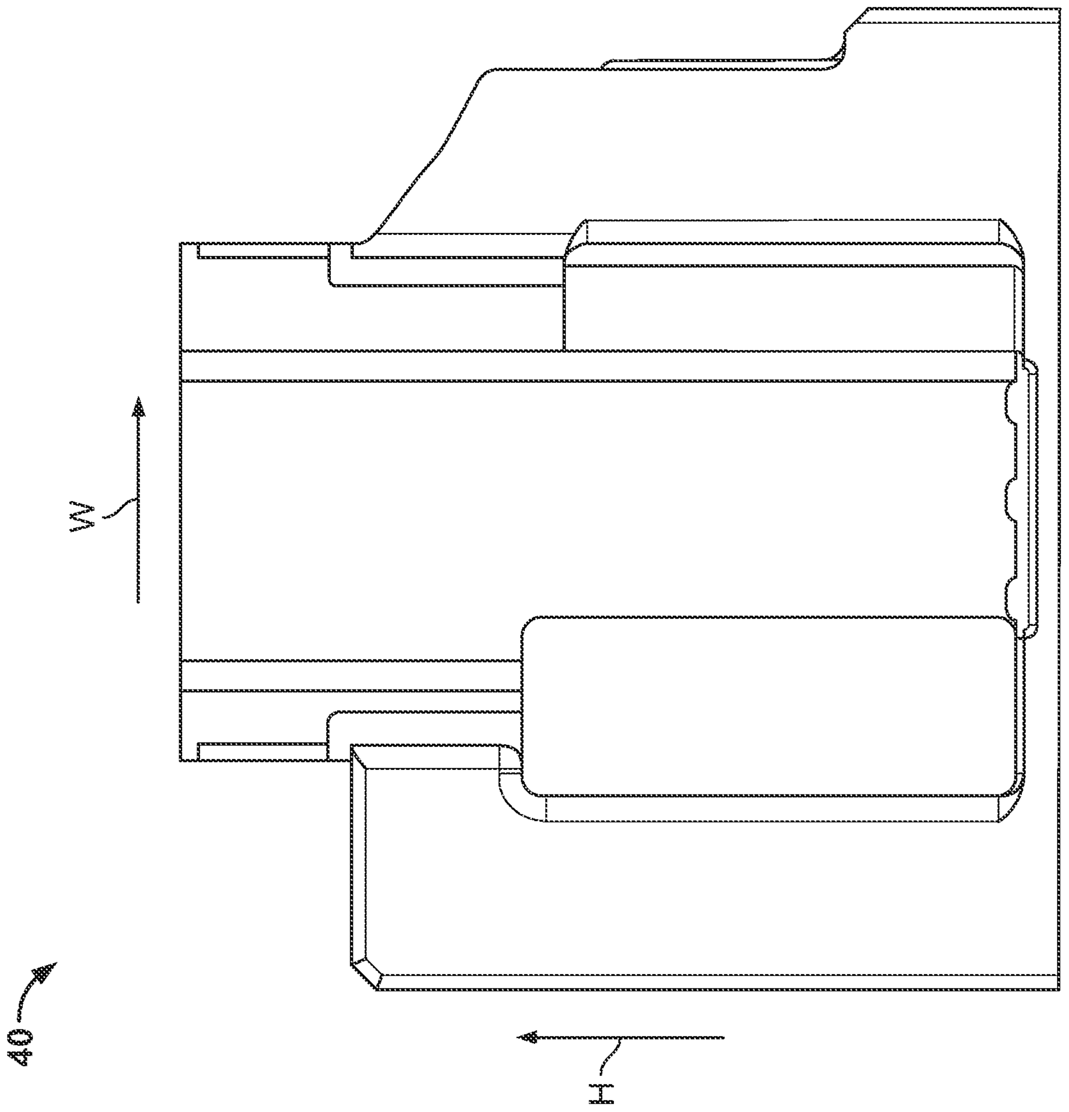
FIG. 9 is a schematic back view of the support structure of the embodiment of a switch.
Figure 10:
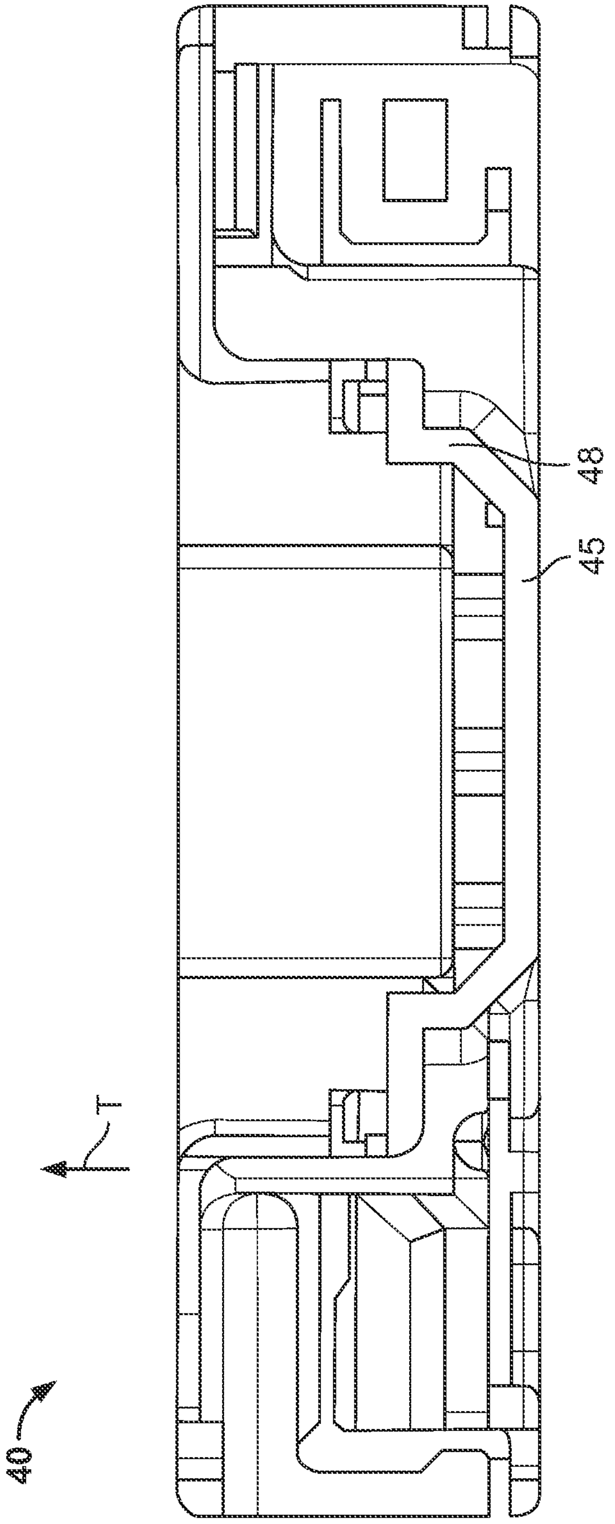
FIG. 10 is a schematic sectional top view of the support structure of the embodiment of a switch.
Figure 11:
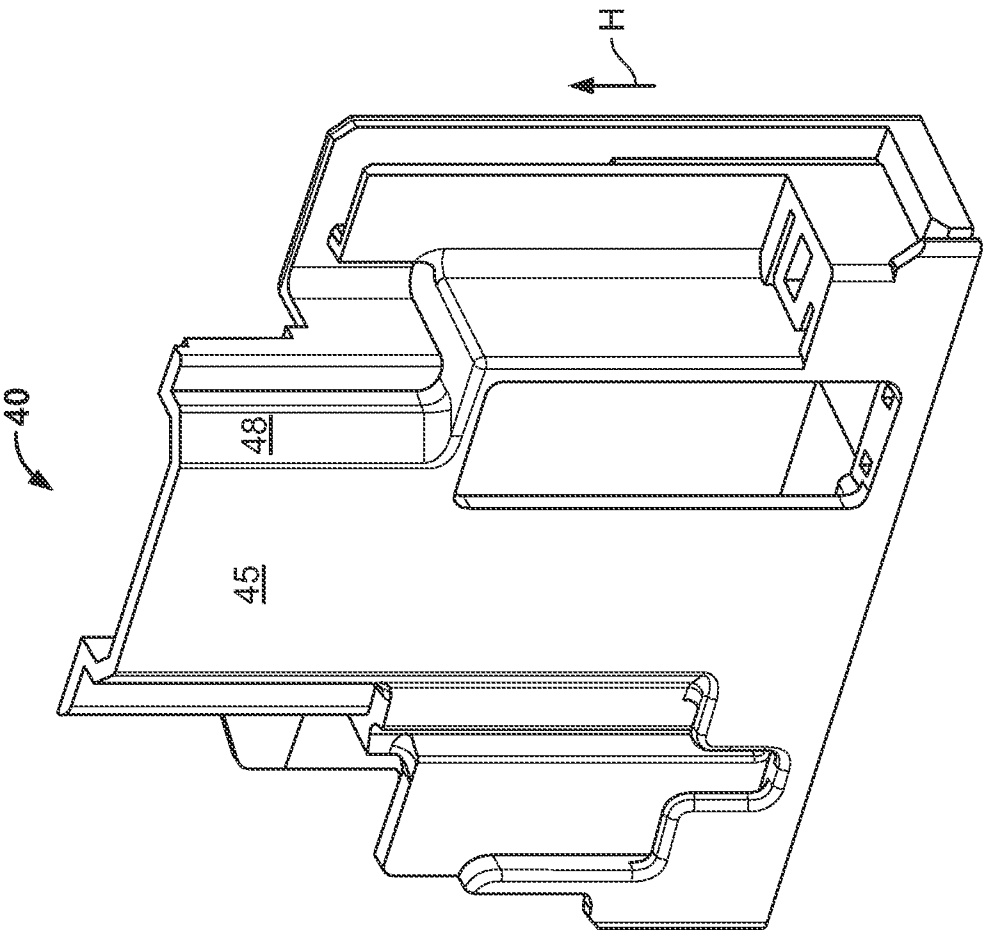
FIG. 11 is a schematic perspective view of the support structure of the embodiment of a switch.
Figure 12:
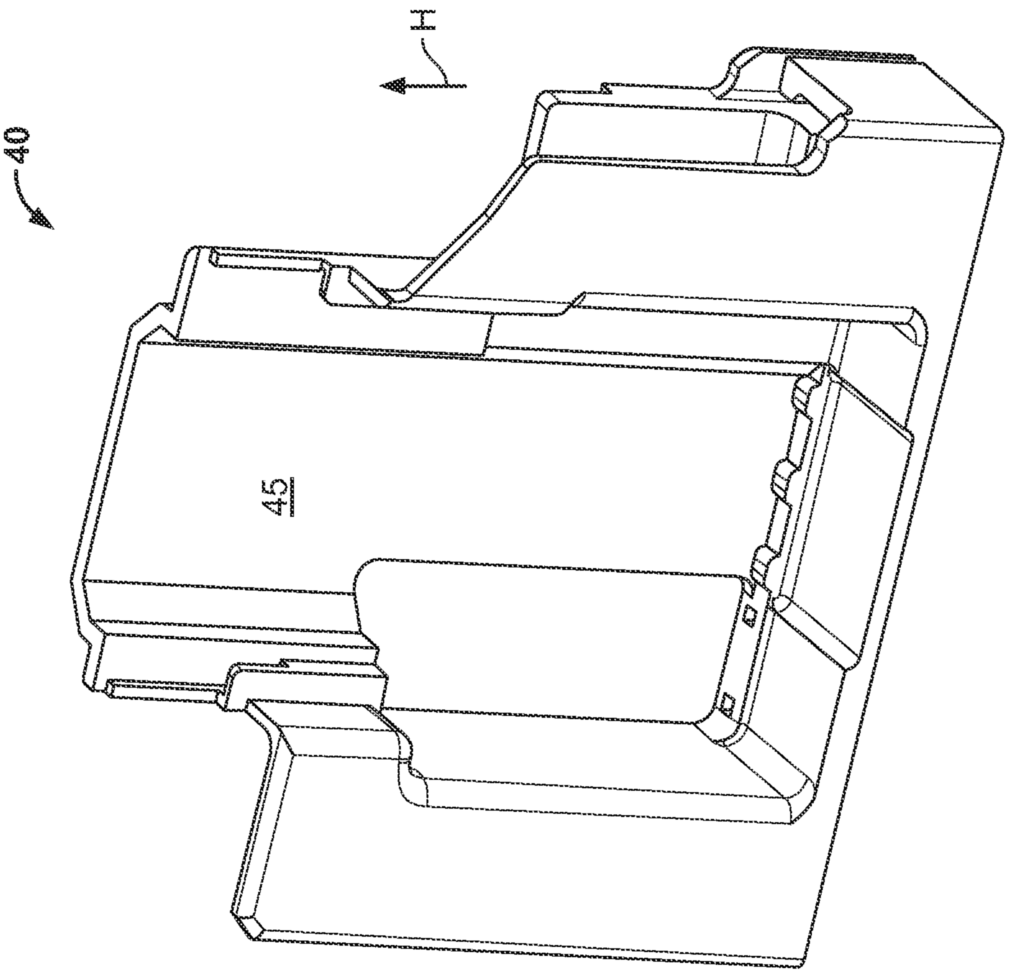
FIG. 12 is a schematic perspective view of the support structure of the embodiment of a switch from a different angle.

The drive mechanism 50 is located beside the set of contacts 10 in a direction W that is perpendicular to a direction in which the contacts 11, 12 are movable for at least one of opening and closing, namely the opening direction O. The drive mechanism 50 comprises a coil 51, a bobbin 52, a yoke 53 and an armature 54, as shown in FIGS. 2, 4, and 7.

The switch 100 comprises a further, second set of contacts 20 with the contacts 21 and 22 as shown, for example, in FIGS. 4-7. The drive mechanism 50 is located between the first set of contacts 10 and the second set of contacts 20; such a solution can switch two circuits in a very compact manner. The drive mechanism 50 is located beside the second set of contacts 20 in a direction W that is perpendicular to an opening direction O of the second set 20 in which the contacts 21, 22 are movable for opening. The opening direction O of the first set of contacts 10 is parallel to the opening direction O of the second set of contacts 20.

The first set of contacts 10 is for opening and closing a first circuit that is normally open and closes upon actuation of the drive mechanism 50. The second set of contacts 20 is for opening and closing a second circuit, which is normally closed and opens upon actuation of the drive mechanism 50. In an embodiment, the first circuit is a load circuit and the second circuit is a safety or checking circuit used to verify the status of the first circuit. It can for example indicate whether the first circuit operates correctly or if a fault, like a welding of the contacts, is present. The contacts 11, 12, 21, 22 can be connected electrically at contact pins 80 at a bottom side.

The first set 10 and the second set 20 are mechanically coupled to each other by force guided coupling. This allows a simple switching of two circuits at once. The switch 100 comprises an actuation element 60, shown in FIGS. 1-7, coupling the armature 54 of the drive mechanism 50 to one contact 12, 22 of each set of contacts 10, 20. The other contacts 11, 21 are stationary and mounted or held in a support structure 40 of the switch 100. The movable contacts 12, 22 are mounted on the actuation element 60, which is movable relative to the support structure 40. The contacts 11, 12, 21, 22 are embodied as elongate elements 31, in particular as leaf springs 30, as shown in FIGS. 1 and 4.

Figure 3:
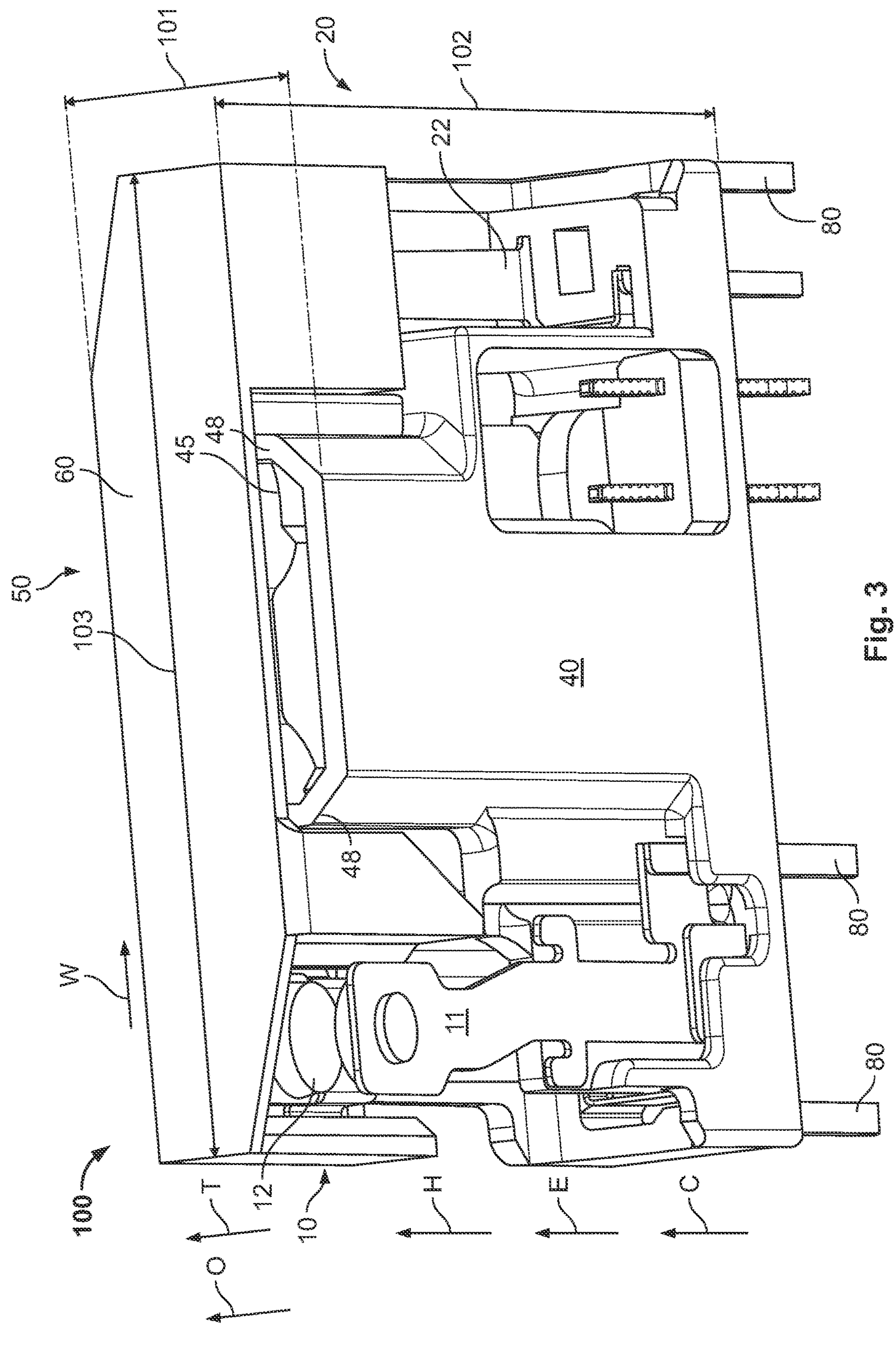
FIG. 3 is a schematic perspective view of the embodiment of a switch.

The support structure 40 of the electric switch 100 comprises a channel-shaped receptacle 45 for the drive mechanism 50, as shown in FIGS. 3 and 7. The support structure 40 is shown in detail in FIGS. 8-12. The support structure 40 comprises insulation walls 48 electrically insulating the drive mechanism 50 from the set of contacts 10, 20. The insulation walls 48 extend along the contacts 11, 12, 21, 22 for insulative effect. The insulation walls 48 are part of the channel-shaped receptacle 45.

The support structure 40 is a monolithic part; it is a single piece that has not been assembled from smaller subunits. The actuation element 60 is also a monolithic part.

Figure 5:
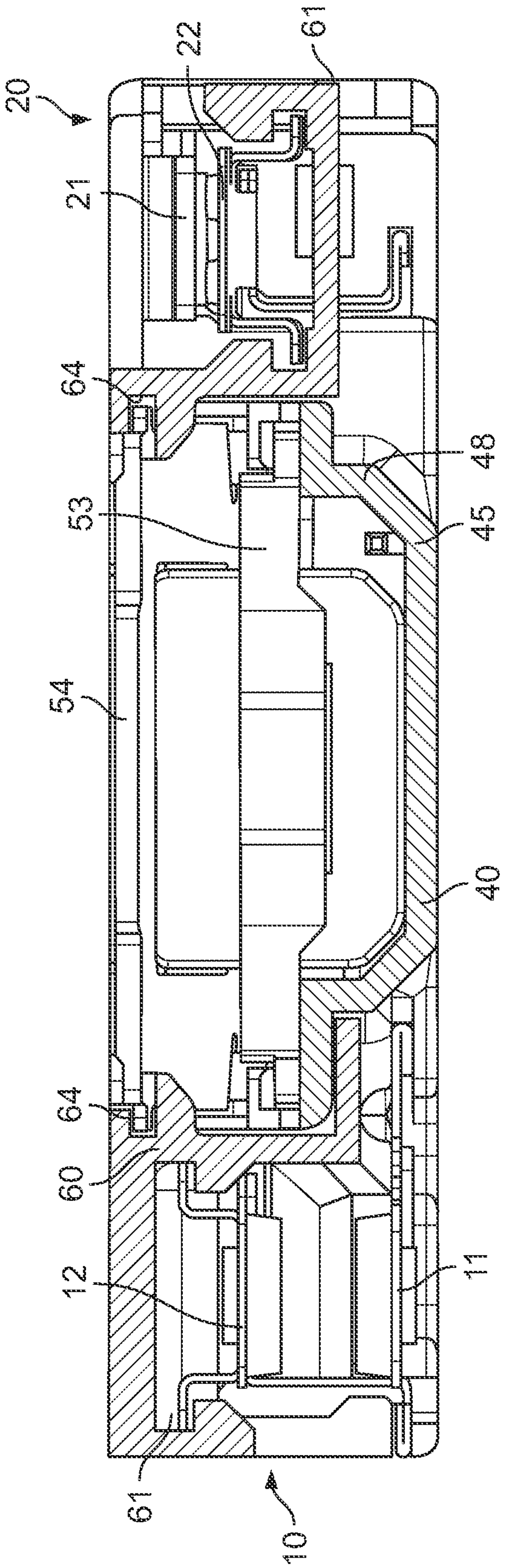
FIG. 5 is a schematic sectional top view of the embodiment of a switch.
Figure 6:
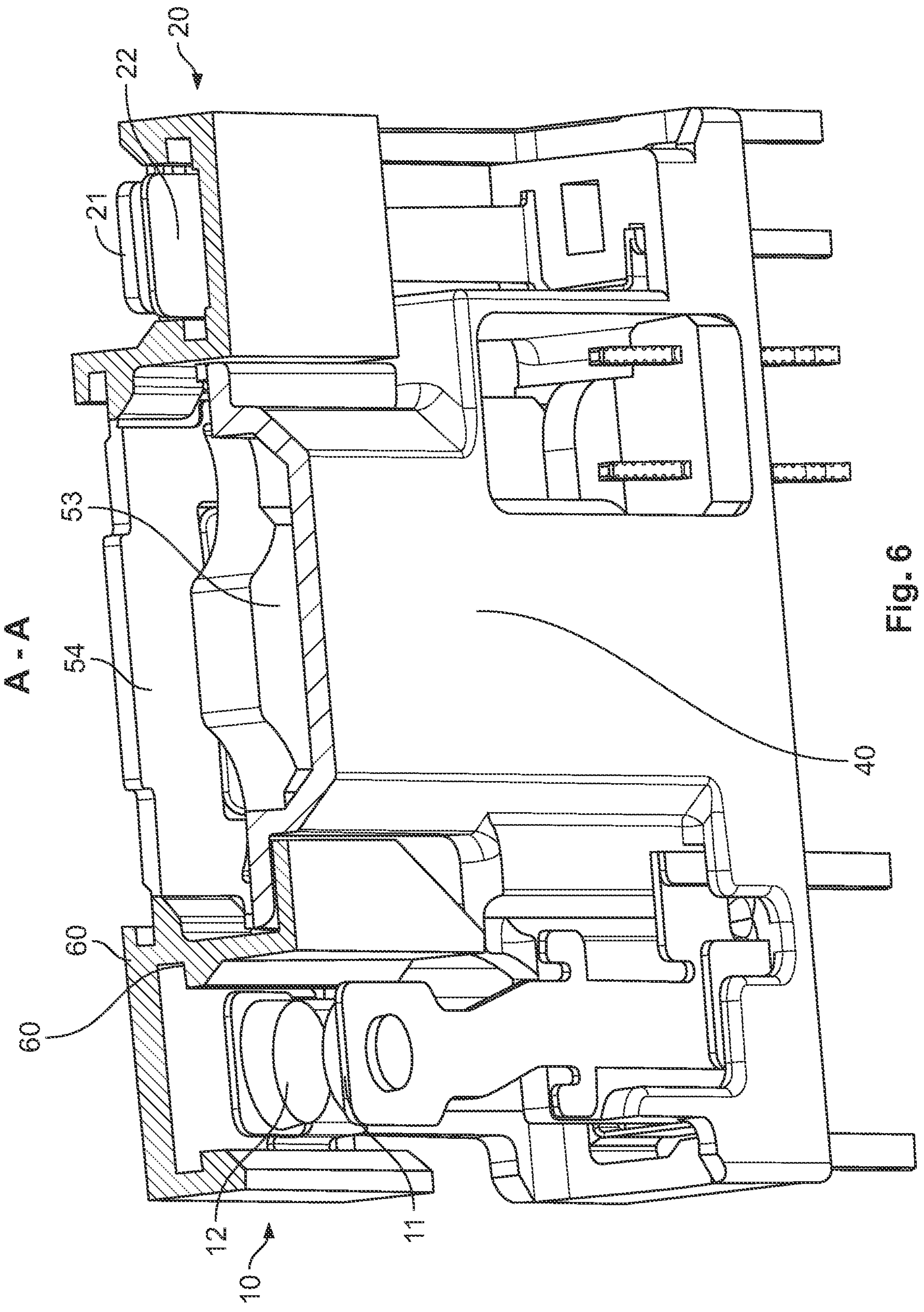
FIG. 6 is a schematic perspective sectional view of the embodiment of a switch.

The actuation element 60 comprises fixing members 64 for the armature 54, shown in FIG. 5, and fixing members 61 for the contacts 11, 12, 21, 22. The contacts 11, 12, 21, 22 of the first set 10 and the second set 20 are elongate elements 31 that extend parallel to each other.

An extension direction E of the elongate elements 31 is perpendicular to the opening directions O. Further, the extension direction E is parallel to a height direction H.

A length 29 of the contacts 11, 12, 21, 22 in the extension direction E is greater than a length 59 of the coil 51, as shown in FIGS. 1 and 2. The contacts 11, 12, 21, 22 extend along an extension direction C of the coil 51. The extension direction C of the coil 51 can run along an axis of the coil 51. The contacts 11, 12, 21, 22 are located next to the armature 54 for a compact configuration.

The switch 100 has a flat configuration. A thickness 101 of the switch 100 in the opening direction O of the contacts 11, 12, 21, 22 that is parallel to the height direction is less than 30% of a height 102 measured in an extension direction E of the contacts 11, 12, 21, 22 and less than 30% of a width 103 measured in a width direction W perpendicular to the opening direction O and the height direction H, as shown at least in FIG. 3. In another embodiment, the thickness 101 is less than 20% of the height 102 and/or the width 103. The switch 100, which is here embodied as a relay, has a thickness of 6 mm or less.

Mounting directions M of the contacts 11, 12, 21, 22, the coil 51 and the armature 54 are parallel to each other. The mounting directions M are parallel to the extension direction E of the contacts 11, 12, 21, 22. The relay or switch 100 has a cuboid shape.

The switch 100 can further comprise a housing for electrical and mechanical protection.

What is claimed is:

1. A switch, comprising:

a pair of sets of contacts including a first set of contacts and a second set of contacts;

a drive mechanism opening and closing the sets of contacts, the drive mechanism is located between the first set of contacts and the second set of contacts in a direction perpendicular to an opening direction in which the first set of contacts and the second set of contacts are movable to at least one of open and close; and an actuation element coupling an armature of the drive mechanism to one contact of each of the pair of sets of contacts, the actuation element has a pair of cavities, one of the contacts of the first set of contacts is received in one cavity of the pair of cavities, and one of the contacts of the second set of contacts is received in another cavity of the pair of cavities, the actuation element forms an upper surface of the switch and extends across an entirety of a width of the switch.

2. The switch of claim 1, further comprising a support structure with a channel-shaped receptacle receiving the drive mechanism.

3. The switch of claim 2, wherein the support structure has an insulation wall electrically insulating the drive mechanism from the sets of contacts.

4. The switch of claim 3, wherein the insulation wall extends along the sets of contacts.

5. The switch of claim 4, wherein the insulation wall is part of the channel-shaped receptacle.

6. The switch of claim 1, wherein the first set of contacts and the second set of contacts are a plurality of elongate elements that extend parallel to each other.

7. The switch of claim 6, wherein an extension direction of the elongate elements is perpendicular to the opening direction.

8. The switch of claim 6, wherein the drive mechanism includes a coil.

9. The switch of claim 8, wherein a length of the first set of contacts and the second set of contacts in an extension direction is greater than a length of the coil.

10. The switch of claim 8, wherein the first set of contacts and the second set of contacts extend along an extension direction of the coil.

11. The switch of claim 1, wherein the sets of contacts are located next to the armature.

12. The switch of claim 1, wherein the switch has a flat configuration.

13. The switch of claim 1, wherein a thickness of the switch in the opening direction is less than 30% of a height of the sets of contacts measured in an extension direction of the sets of contacts.

14. The switch of claim 13, wherein the thickness of the switch in the opening direction is less than 30% of a width of the switch measured perpendicular to the opening direction and the height of the sets of contacts.

15. The switch of claim 1, wherein the drive mechanism has a coil.

16. The switch of claim 15, wherein the sets of contacts have a mounting direction parallel to the coil and the armature.

17. The switch of claim 2, wherein the actuation element fits around the support structure.

18. A switch, comprising:

a pair of sets of contacts including a first set of contacts and a second set of contacts;

a drive mechanism opening and closing the sets of contacts, the drive mechanism is located between the first set of contacts and the second set of contacts in a direction perpendicular to an opening direction in which the first set of contacts and the second set of contacts are movable to at least one of open and close; and an actuation element coupling an armature of the drive mechanism to one contact of each of the pair of sets of contacts, the actuation element extends around one of the contacts of the first set of contacts and is open counter to the opening direction at the first set of contacts, the actuation element extends around one of the contacts of the second set of contacts and is open in the opening direction at the second set of contacts, the actuation element forms an upper surface of the switch and extends across an entirety of a width of the switch.

19. The switch of claim 1, wherein the one cavity partially encloses an end of the one of the contacts of the first set of contacts, and the other cavity partially encloses an end of the one of the contacts of the second set of contacts.

20. The switch of claim 1, wherein each cavity is defined by a top wall and three side walls of the actuation element.

* * * * *